United States Patent
Harlacher et al.

(10) Patent No.: US 9,807,110 B2
(45) Date of Patent: Oct. 31, 2017

(54) METHOD AND SYSTEM FOR DETECTING ALGORITHM-GENERATED DOMAINS

(71) Applicant: VECTRA NETWORKS, INC., San Jose, CA (US)

(72) Inventors: James Patrick Harlacher, San Jose, CA (US); Aditya Sood, Jersey City, NJ (US); Oskar Ibatullin, San Jose, CA (US)

(73) Assignee: Vectra Networks, Inc., San Jose, CA (US)

( * ) Notice: Subject to any disclaimer, the term of this patent is extended or adjusted under 35 U.S.C. 154(b) by 0 days.

(21) Appl. No.: 14/644,194

(22) Filed: Mar. 10, 2015

(65) Prior Publication Data
US 2015/0264070 A1    Sep. 17, 2015

Related U.S. Application Data (60) Provisional application No. 61/951,483, filed on Mar. 11, 2014.

(51) Int. Cl.
    *H04L 29/06* (2006.01)
(52) U.S. Cl.
    CPC ...... *H04L 63/1441* (2013.01); *H04L 63/1408* (2013.01)
(58) Field of Classification Search
    CPC . H04L 63/1408; H04L 63/14; H04L 63/1416; H04L 63/1425
    See application file for complete search history.

(56) References Cited

U.S. PATENT DOCUMENTS

| | | | | |
|---|---|---|---|---|
| 8,260,914 B1* | 9/2012 | Ranjan | ................ | H04L 61/1511 709/224 |
| 8,555,388 B1* | 10/2013 | Wang | .................. | H04L 63/1416 709/245 |
| 2011/0167495 A1 | 7/2011 | Antonakakis et al. | | |
| 2012/0084860 A1* | 4/2012 | Cao | ..................... | H04L 63/1441 726/23 |
| 2012/0159620 A1* | 6/2012 | Seifert | ................ | H04L 63/1416 726/22 |
| 2012/0303808 A1* | 11/2012 | Xie | ..................... | H04L 63/0236 709/225 |
| 2013/0100958 A1 | 4/2013 | Jalan et al. | | |
| 2013/0174253 A1* | 7/2013 | Thomas | .............. | H04L 63/1416 726/22 |
| 2013/0191915 A1* | 7/2013 | Antonakakis | .......... | H04L 63/14 726/23 |
| 2014/0007238 A1* | 1/2014 | Magee | .................. | G06F 21/577 726/24 |

(Continued)

OTHER PUBLICATIONS

PCT International Preliminary Report on Patentability for International Appln. No. PCT/US2015/019801, Applicant Vectra Networks, Inc., et al., dated Sep. 22, 2016 (8 pages).

(Continued)

*Primary Examiner* — Khang Do
(74) *Attorney, Agent, or Firm* — Vista IP Law Group, LLP (57) ABSTRACT

A method and system for detecting algorithm-generated domains (AGDs) is disclosed wherein domain names requested by an internal host are categorized or classified using curated data sets, active services (e.g. Internet services), and certainty scores to match domain names to domain names or IP addresses used by command and control servers.

27 Claims, 10 Drawing Sheets

(56) References Cited

U.S. PATENT DOCUMENTS

2014/0245374 A1* 8/2014 Deerman ................ H04L 63/20
                                                        726/1
2015/0047033 A1* 2/2015 Thomas .............. H04L 61/1511
                                                        726/23

OTHER PUBLICATIONS

International Search Report & Written Opinion dated Jun. 24, 2015 for PCT Appln. No. PCT/US2015/019801.

* cited by examiner

METHOD AND SYSTEM FOR DETECTING ALGORITHM-GENERATED DOMAINS

RELATED APPLICATION DATA

The present application claims the benefit of U.S. Provisional Application Ser. No. 61/951,483, filed on Mar. 11, 2014, titled "Method and System to Detect Algorithm-Generated Domains", the content of the aforementioned application is hereby incorporated by reference in its entirety.

BACKGROUND

Malware authors are developing increasingly sophisticated and robust solutions to evade detection of Command and Control (C&C) servers, which are used for managing large sets of infected hosts on the Internet. In recent years, malware authors have began utilizing algorithms that generate pseudo-random sets of C&C domains based on a specific time-dependent seed value. Specifically, the C&C servers generate a large set of unpredictable pseudo-random domains. Then, the C&C servers register one pre-selected domain that resolves via the Domain Name System (DNS) protocol to the Internet Protocol (IP) address of the C&C server. Generally, the algorithms used to generate the pseudo-random domains are called Domain Generation Algorithms (DGAs) and the generated domains are called Algorithm-Generated Domains (AGDs). The process of creating sets of new domains is repeated periodically, which means a new set of AGDs is generated often and the domains utilized for command and control are moved regularly.

DGAs were originally designed to provide a secure fallback (e.g. non-primary) communication mechanism for when the primary communication mechanisms between an infected host and C&C servers fail. However, an increasing number of malware families have started using DGAs as a primary mechanism for locating C&C servers. Use of a DGA subverts DNS blacklisting approaches because AGDs used for C&C servers are used for only a short period of time; typically, right after being created. If a particular AGD is blacklisted, the C&C server simply uses a new domain.

While the large lists of AGDs for a number of different types of malware can be predicted beforehand, doing so requires reverse engineering of the malware, which is a difficult and time consuming task. Further, some DGA designs have begun employing late-arriving random seed value, which are based on information retrieved from benign services on the Internet; thus delaying a defender's ability to generate and blacklist the AGDs up front. All these features and characteristics make DGAs a substantial threat.

As is evident, there is a demand for new approaches for detecting DGAs in an efficient and effective manner.

SUMMARY

As according to some embodiments, an approach for detecting algorithm-generated domains is disclosed in which one or more domain names requested by an internal host (e.g. a computer entity inside a network) may be monitored and categorized. In some embodiments, the categorization may be implemented by determining whether a domain name matches domain names in lists of curated data. In some embodiments, the categorization may be implemented by using one or more Internet or active services (e.g. network interfaced services) to determine whether the domain name under analysis matches domain names known to be suspicious or otherwise previously classified.

Once categorized, the domain names may be assigned to bucket data structures in which analysis points may be assigned. The analysis points may correspond to how the one or more domain names were categorized. The analysis points may correspond to a range of numerical values. In some embodiments, if a domain name under analysis corresponds to a numerical value of analysis points such that a threshold is exceeded, reporting data is generated and may be stored in a database.

In some embodiments, a certainty score may be generated using certainty parameters. In some embodiments, the certainty parameters may correspond to one or more conditions such as necessary/sufficient conditions, or time related conditions, or behavior related conditions. The certainty score and/or reporting data may then be used by human experts (e.g. IT security/administrate staff) or may be also be used by machine learning schemes for further modification, optimization, and customization.

DETAILED DESCRIPTION

Attackers infect hosts for a variety of reasons. One common reason attackers infect hosts is to make money by using the infected system to perform work for the attacking computer. When an infected host is inside a company's network, the attacker can also instruct malware installed on the infected host to steal valuable company information and transmit it to the attacker. Typically, these scenarios depend on the infected host establishing stable C&C communications with the external attacker in a way that blends in with normal traffic in the company's network so the communication is not detected.

Figure 1A:
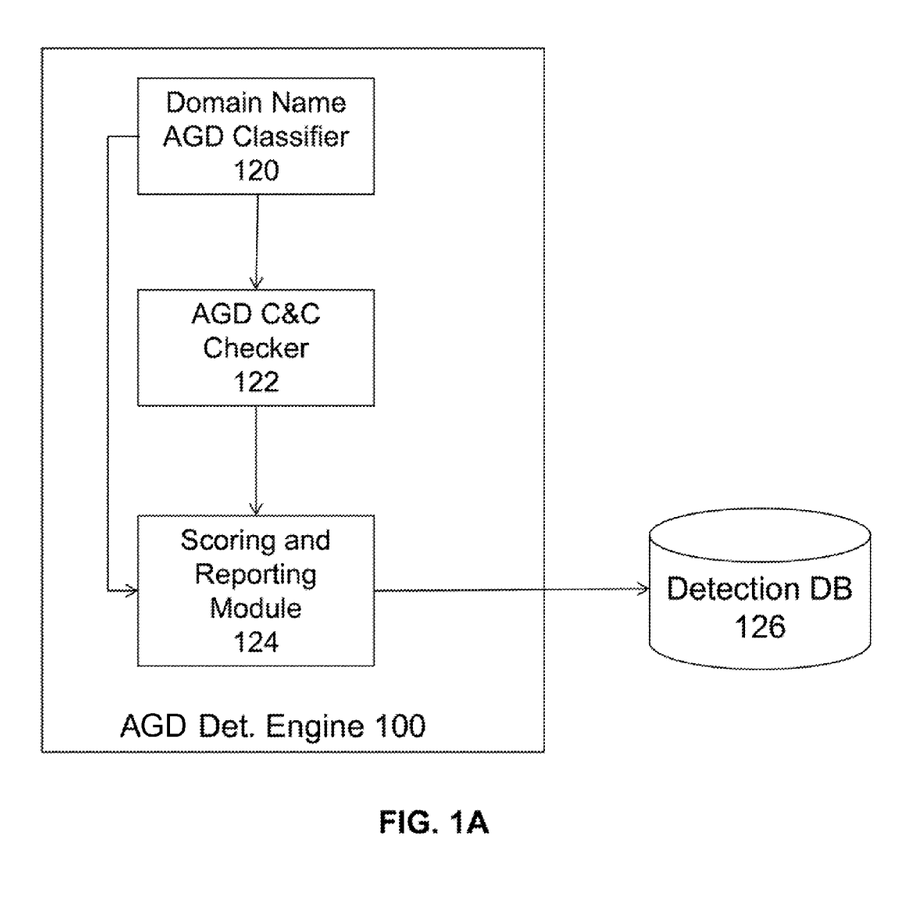
FIG. 1A illustrates a system for detecting algorithm generated domains (AGDs), as according to some embodiments.

FIG. 1A illustrates an approach to implement an engine 100 for detecting algorithm-generated domains, as according to some embodiments. At 120, a Domain Name AGD Classifier (e.g. classifier module) may process a domain name extracted from a DNS response to determine whether the name is an Algorithm Generated Domain (AGD). If the domain is determined to not be an AGD, it may be ignored. If the domain name is determined to be an AGD, but the domain has not been registered, the process may skip the checking (e.g. 122) and continue to further processing during scoring and reporting at 124.

However, if the domain is determined to be a registered AGD, the process continues from 120 to 122, where the domain under analysis is checked. At 122, the AGD C&C Checker (e.g. checker module) determines whether the domain under analysis is a registered AGD that is likely to be used for C&C communications (discussed in further detail below). If it is determined that the domain under analysis is unlikely to be a domain used for C&C communications, the domain name is ignored.

In some embodiments, a scoring and reporting module (e.g. 124) determines the certainty that the potentially infected host is trying to perform a C&C communication. In some embodiments, this determination may depend on the variety of AGDs requested by a potentially infected host, as well as the characteristics of the AGD, as explained in further detail below. After the certainty is determined, the scoring and reporting module may publish the domain name and the corresponding certainty score at 126.

Figure 1B:
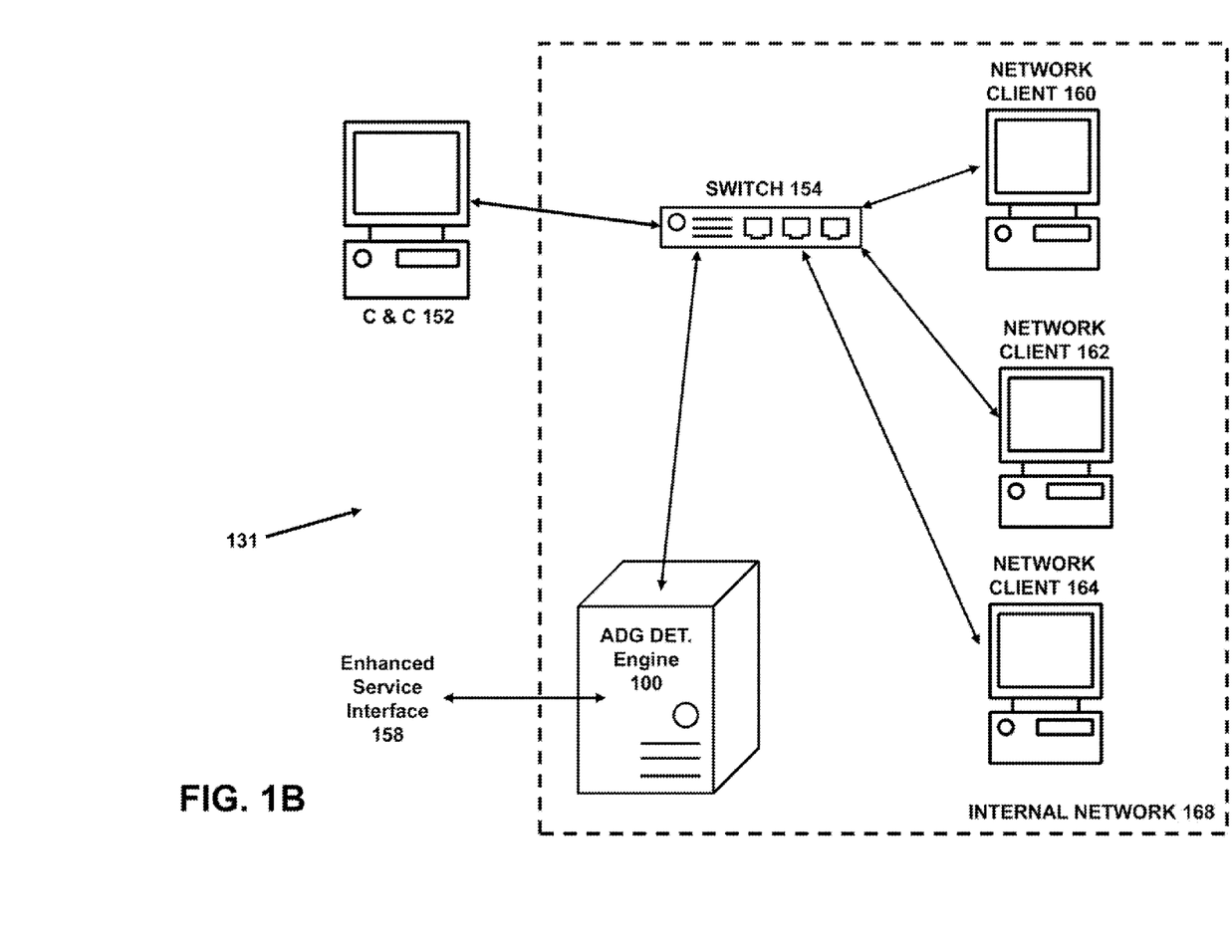
FIG. 1B illustrates an environment in which the system for detecting AGDs may be implemented, as according to some embodiments.

FIG. 1B illustrates an environment 131 in which the system for detecting AGDs may be implemented, as according to some embodiments. There, an attacking entity (e.g. C&C server, attacking computer) 152 interfaces with computers in an internal network 168 through various methods, such as a network switch 154 or firewall. The internal network 168 comprises one or more network clients 160, 162, 164. Although in FIG. 1B the entities inside the internal network are represented as clients, one of ordinary skill in the art appreciates that other entities, (e.g. nodes, servers, hosts) may also be attacked by the attacking entity 152. In some embodiments, an AGD detection engine 100 can be implemented to analyze and detect AGDs by making a copy of the internal network traffic by tapping the network switch 154. Additionally, though the AGD detection engine 100 is illustrated as an independent module inside the internal network 168, the detection engine may also be implemented outside the network, or may comprise computer code managed and executed on an internal entity (e.g. 160), or may be a distributed system that runs across all internal entities (e.g. 160, 162, 164). Further, as according to some embodiments, the AGD detection engine 100 may be integrated directly into a network interface component such as a firewall or network switch 154. In some embodiments, as explained below, the detection engine 100 may interface with external enhancement (e.g. active) services 158, such as active services.

Figure 1C:
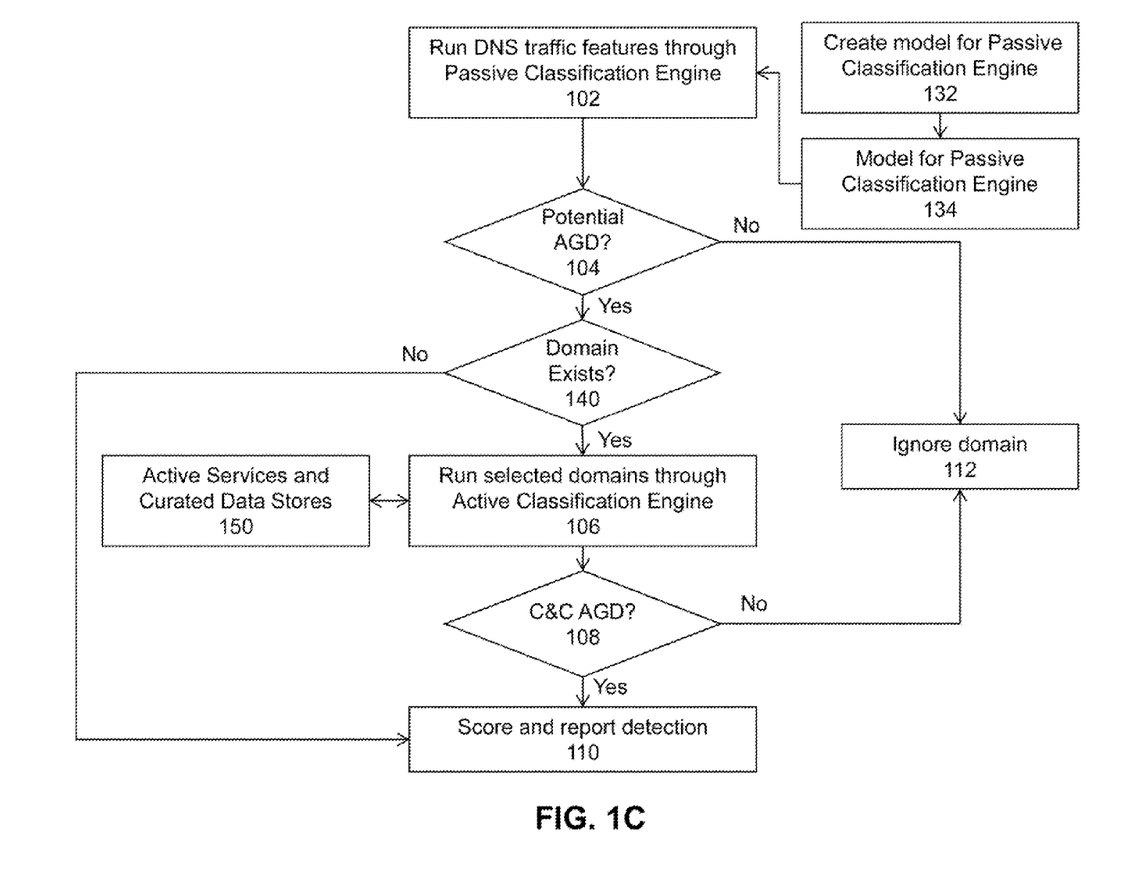
FIG. 1C shows a flowchart for an approach for detecting algorithm generated domains, as according to some embodiments.

FIG. 1C shows a flowchart for an approach for detecting algorithm generated domains, as according to some embodiments. An infected host (e.g. network client 160, FIG. 1B) can establish a C&C communication (destined for the C&C server 152) by first using a DNS query to obtain the IP address of a C&C server 152. The detection system 100 (FIG. 1B) may obtain a copy of the DNS request and the matching response through the network switch 154 (FIG. 1B), as according to some embodiments. After extracting the one or more domain names out of the DNS response, a passive classification engine 102 may determine whether the requested domain name is a potential AGD at 104 (FIG. 1C). In some embodiments, the passive classification engine depends on a previously developed model 134 that is created by distilling the characteristics of various DGA samples 132 (discussed in further detail below).

If at 104, the requested domain names are determined to have characteristics of C&C DGAs a check is made if the domain name exists at 140 and if it does, the domain name (e.g. data corresponding to the domain name) is passed to the Active Classification Engine for analysis at 106. The Active Classification Engine may consult one or more curated datasets 150 that assist in classifying the domain names. Further, the active classification engine 106 may also utilize active services 150 available, for example, on the Internet to assist in determining whether to report an internal host as infected. At 108, analysis may be conducted using the active services and curated data to determine whether the AGD is likely to be a C&C related AGD. If the result of the analysis indicates that the domain under consideration is not a C&C AGD, the domain may be ignored at 112. However, if the analysis indicates that the domain under analysis is in fact likely to be a C&C AGD, the process may continue to scoring and reporting at 110, as according to some embodiments. At 110, a detection may be reported to the company's IT (Information Technology) security staff or other administrators as required per implementation. In some embodiments, the process at 110 involves reporting the individual instance of the detection and calculating a certainty score for the collection of recently seen detections for the same internal host.

Figure 1D:
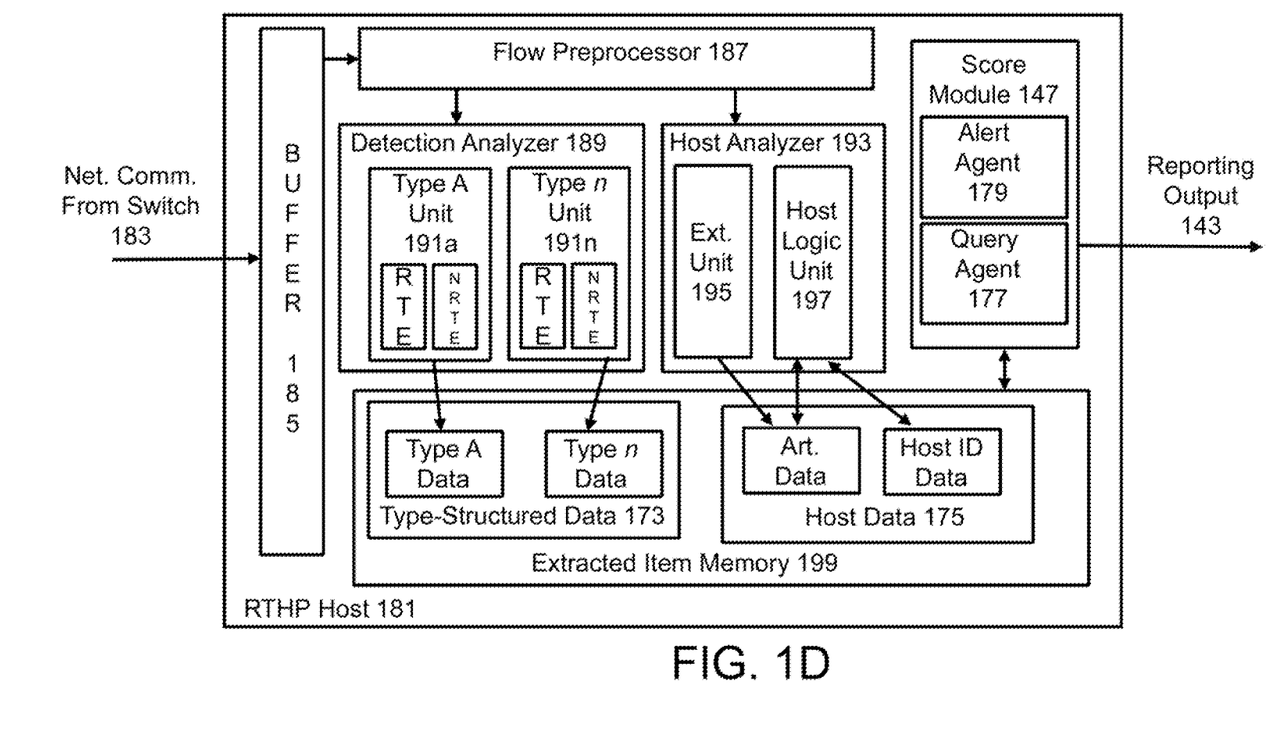
FIG. 1D illustrates internal aspects of a detection engine in which the algorithm domain detection system may be implemented.

FIG. 1D illustrates an example system in which the approaches disclosed may be implemented. FIG. 1D shows internal aspects of a real-time historical perspective engine (RTHP) 181. At 183, network communications from a switch may be received by RTHP 181 and loaded into a buffer (e.g. rolling buffer) memory structure 185. A flow preprocessor 187 can parse the network traffic using one or more parsing units (not depicted), each of which may be tuned to parse different types of network traffic (e.g. HTTP, TCP). In some embodiments, the flow preprocessor 187 generates session datasets that correspond to communications between two hosts (e.g. between two hosts inside a network or between an external host/entity and an internal host).

The session datasets may be analyzed by a detection analyzer 189, which detects different types of threats or analysis data, and a host analyzer 193, which analyzes the hosts which generated the network traffic. In some embodiments, the detection analyzer 189 and host analyzer 193 may extract one or more data items and store them in an extracted item memory 199.

In particular, the session datasets may be analyzed by a detection analyzer unit 189, which may comprise one or more detection units 191*a*-191*n*. In some embodiments, the detection units may contain a real time analysis engine ("RTE") which can identify threats without collecting past data (e.g. accumulating state) and a non-real-time analysis engine ("NRTE"), which generally accumulates data about network events that appear benign, but accumulate to significant threat levels (e.g. DDoS attacks).

In some embodiments, the detection units are customized to analyze the session datasets and extract type-specific data that corresponds to various network threats, attacks, or analysis parameters. For example, detection unit Type A 191A may be designed for detecting relay communication attacks; for every type of relay communication detected, detection unit Type A 191 may store the detection in "Type A" structured data. As a further example, detection unit Type n 191n may be designed to detect bot activity, such that every time a computer or host in the network performs bot-related activities, detection unit Type n may store detection-related data in "Type n" structured data. In some embodiments, the detection data per unit may be stored in a type-structured data 173 portion of memory, which may be partitioned from extracted item memory 199.

In some embodiments, the host analyzer 193 comprises an extraction unit 195 and a host logic unit 197. The extraction unit 195 is designed to extract artifacts or identification data (e.g. MAC address, IP address), which may be used to identify a host, and store the extracted data in an artifact data store ("Art. Data") in host data 175. The host logic unit may analyze the extracted artifact data and generate host ID data (e.g. durable host IDs).

In some embodiments, a score module 147 may be implemented to analyze the extracted item memory 199, score the detections in the type-structured data 173, and correlate the detections with host ID data. In some embodiments, the score module 147 can run checks on the type-structured data to determine if any thresholds have been exceeded. In some embodiments, the score module may edit or update the host ID data (e.g. in host data 175) with new detection information. For instance, the score module may correlate newly detected bit-coin mining activity to an existing host ID and update the host ID with further information regarding the recent bit-coin activity. In some embodiments, the score module 147 further comprises an alert agent 179 which can generate alert data if a network attack threshold is exceeded. In some embodiments, the score module 147 comprises a query agent 177 which can retrieve data from the extracted item memory 199 in response to network security administrators or other network security devices. In some embodiments, the score module may generate the alert data or query responses as reporting output 143.

Further details of an example system are described in U.S. patent application Ser. No. 14/643,931, entitled "A system and method for detecting intrusions through real-time processing of traffic with extensive historical perspective", filed on even date herewith, which is hereby incorporated by reference in its entirety.

Figure 2:
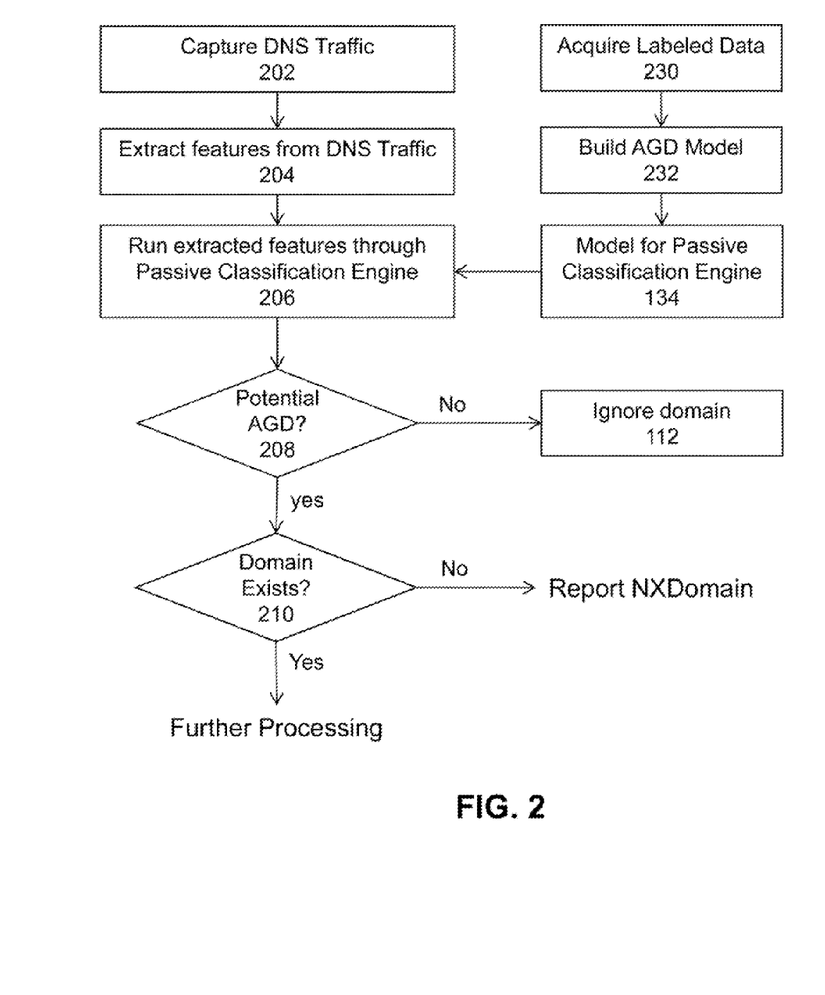
FIG. 2 shows a flowchart for an approach for detecting algorithm generated domains including training a model, as according to some embodiments.

FIG. 2 shows a flowchart for an approach for detecting algorithm-generated domains including training a model, as according to some embodiments. There, the Passive Classification Engine 206 may be dependent on a model 134 to efficiently detect and categorize AGDs. The model 134 may consist of data that describes characteristics of AGDs utilized for C&Cs such as the probability of sequences of letters and numbers in an AGD, the probability of certain length AGDs, the likelihood of AGDs in certain top-level domains (e.g. .com, .org, .edu) as well as other characteristics of the series of characters comprising the AGD. In some embodiments, the process of creating such a model depends on substantial quantities of labeled domain names 230, which are large sets of data describing normal (non-AGD) domain names popularly used on the Internet, as well as a smaller set of known bad past AGDs. The smaller set of known bad past AGDs, in some cases, may be obtained from reputation lists or by running reverse-engineered DGAs from existing malware to create samples.

The design of and creation of the model 232 and the associated use of the model (in the Passive Classification Engine) is flexible and modular. In some embodiments, the model and classification engine may incorporate any classifiers, such as Naïve Bayes, decision trees, Support-Vector Machines (SVM), K-means and others depending on the efficacy of the classifier for distilling the characteristics of the sample data supplied. In some embodiments, the model (e.g. 134) does not include lists of domain names or IP addresses. Instead, it may include a distillation of the sample data. In some embodiments, the model may be periodically updated based at least in part on the availability of newly labeled data. Once the model has been created, it may be made available to the Passive Classification Engine 206.

At 202, the detection system may observe DNS traffic in a company's network 202. This may be implemented by plugging the detection system into the company's network at an appropriately located and configured mirror port or TAP (Test Access Point) port (e.g. network switch 154, FIG. 1B). Typically, DNS supports queries for a number of different types of information. For instance, a common type of query is for an "A" record. Other queries include lookups for MX (Mail eXchange), NS (Name Server) and PTR (PoinTer Record). For example, DNS responses for queries of A records which either succeed or result in a "non-existent Domain" (NXDomain) response may be processed by the detection system. The IP address of the internal requesting host, the domain name queried and one or more corresponding IP addresses (e.g. IP addresses resolved to the domain names) are extracted from the DNS response 204. At 208, the Passive Classification Engine 206 may utilize only the domain names with the model to determine whether there is a reasonable likelihood of the domain name being an AGD for C&C.

If the domain name is unlikely to be an AGD for C&C 208, it may be ignored at 112. However, if the system detects a domain name as a potential AGD that is registered, it may pass the domain name (including one or more associated IP addresses) and the IP address of the internal host to the curated data and active service modules to determine at 210 whether the domain exists. But if the domain name is not registered (as may be indicated by a DNS response with a NXDomain response), the detection may bypass the next steps and may proceed directly to the reporting stage, described with reference to FIG. 5 below.

Figure 3:
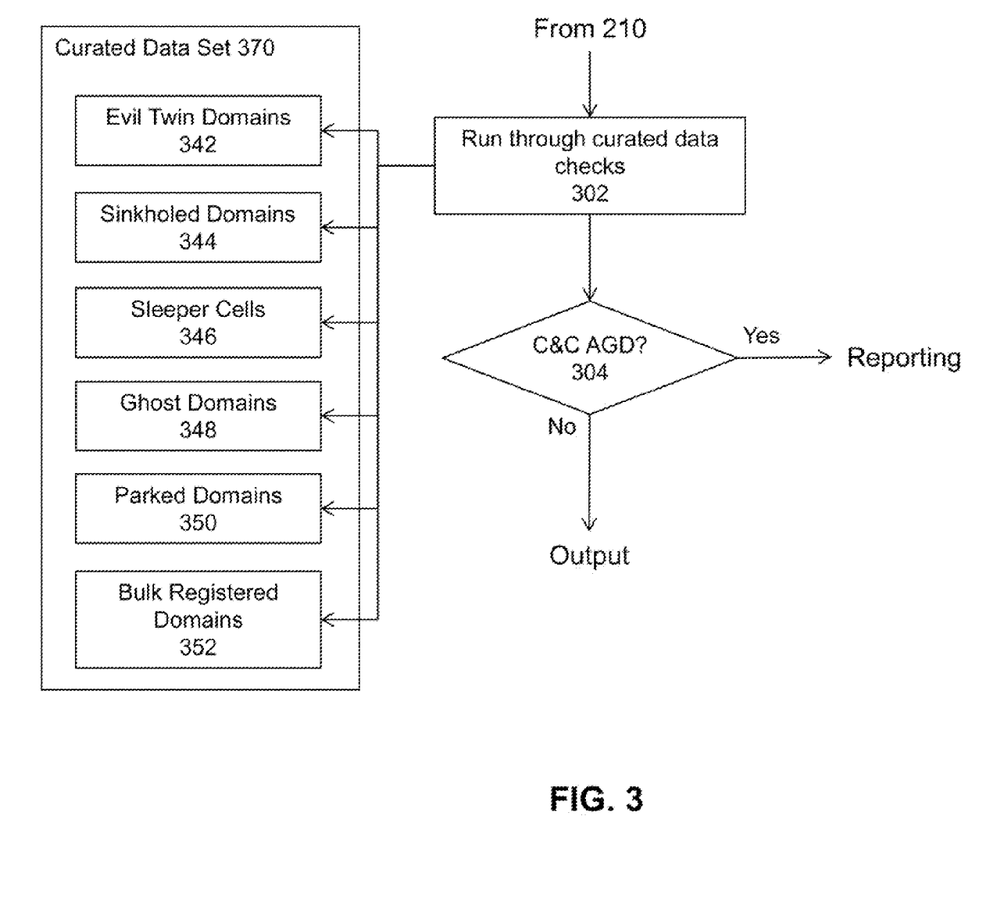
FIG. 3 shows an approach for using curated data in the system for detecting algorithm generated domains, as according to some embodiments.

FIG. 3 shows an approach for using curated data in the system for detecting algorithm generated domains, as according to some embodiments. Generally, a domain name can be dissected into Top-Level Domain (TLD), Second-Level Domain (SLD), etc. A TLD represents a highest level in the hierarchy of DNS on the Internet. An SLD is a domain name placed directly below the TLD. For example: for abc.com, "abc" is an SLD and "com" is a TLD. In some cases (and countries), the TLD takes on a more complex form: in abc.co.uk, "abc" is the SLD, and "co.uk" is the TLD.

As according to some embodiments, at 302, the detection system may run or check the AGD to analyze whether the domain matches or corresponds to curated data sets (e.g. domain name model), such as curated dataset 370. The curated data set may comprise a database with data (or list) describing different types of AGDs with known characteristics, such as Evil Twin Domains 342, Sinkholed domains, sleeper cells 346, ghost domains 348, parked domains 350, and/or bulk-registered domains 352. In some embodiments, domain name categorization data is generated if a domain name corresponds to a domain in the curated dataset. For example, if it is determined that a requested domain name is an evil twin domain, then domain name categorization data indicates that the domain name under analysis matches or corresponds to an evil twin domain. In some embodiments, the domain name categorization data is generated and stored in memory for later analysis and processing. Though here curated data set 370 is illustrated as comprising several specific types of curated data, one of ordinary skill in the art appreciates that different types of curated data (e.g. collected datasets, aggregated data, categorized data) can also be implemented within 370.

Generally, Evil Twin Domains 342 are AGDs with similar SLDs but different TLDs observed within a given time window during which their other twin(s) are known to be evil via some other mechanism. Sinkholed Domains 344 are domain names that have been redirected to servers that are controlled by security organizations. This may be done to better understand the behavior of specific botnet family or in an attempt to "take down" or lessen the impact of a botnet. An infected host that communicates with a sinkholed server often does not know that it isn't communicating with its real C&C server.

Sleeper Cells 346 are domain names that are assigned temporary IP addresses that are configured for halting communication. This can either be a temporary circumstance when attackers are in the midst of migrating their C&C infrastructure or can result from the owning registrar assigning an unreachable IP address in an effort to aid in taking down of a botnet. Ghost Domains 348 are domain names that have been registered but for which no IP addresses have been assigned.

Parked Domains 350 are domain names that are not actively in use either because they have never been really used or because they have expired after a period of use. These domains usually resolve to IP addresses of servers that present ads or show a basic page supplied by the owning registrar. Bulk Registered Domains 352 are discovered by analyzing patterns in domain registration information. Malware operators often register a massive number of domain names using automation. This process results in groups of similar domains (for example, the date of registrations may be the same). When one or more domains in such groups are utilized for malware infrastructure (e.g. hosting a C&C server), this raises the likelihood of other domains in the same group being malicious as well.

In this stage of the process, the system performs checks against the curated data sets described above 302. In some embodiments, at 304 when the system detects that an IP address corresponds to a domain resolved as a sleeper cell domain or evil twin domain, it may skip all other processing and reports ("Reporting") the domain name (and may store it to the database) as described below with reference to FIG. 5. However, even if a sleeper cell domain or evil twin domain is detected, in some embodiments the detection system may still check to determine whether the domain name under analysis matches any domains in the ghost domain list or in the parked domain list (e.g. under a "check-all" scheme). The outcome of these checks (e.g. the data classifying the analyzed domain name) may then be output ("Output") along with the domain name data (e.g. domain identification data) for further analysis, as described below.

Figure 4:
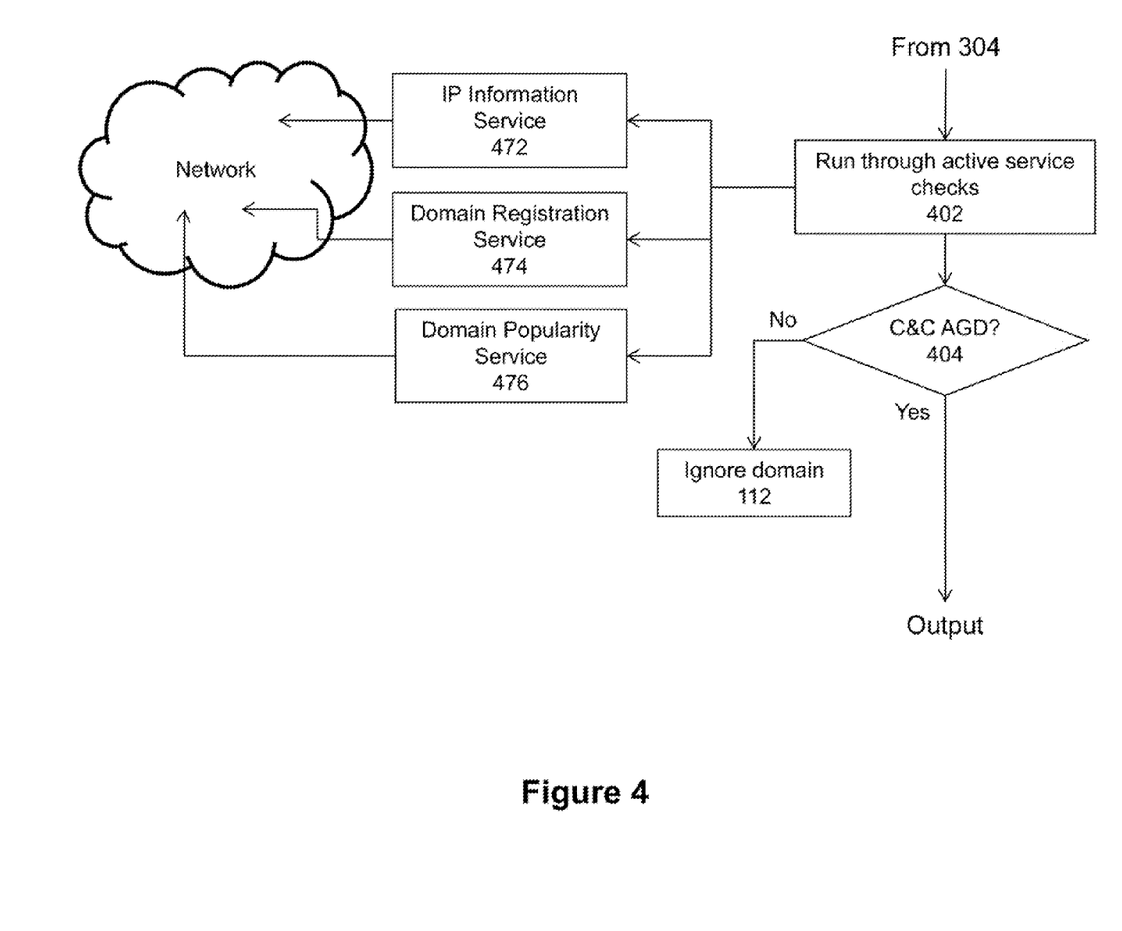
FIG. 4 shows an approach for using active services in the system for detecting algorithm generated domains, as according to some embodiments.

FIG. 4 shows an approach for using active services in the system for detecting algorithm generated domains, as according to some embodiments. The input at 402 may comprise the domain name data and corresponding data generated at 304 (FIG. 3). Generally, a domain name that enters this part of the system is known to have resolved to one or more IP addresses, to not be an evil twin, to not be sinkholed and to not be in a sleeper cell.

At 402, input data is processed using active service check modules. The active service modules interface with a network 490 (e.g. the Internet) to collect or aggregate data that may be used to further characterize the domain name under analysis. FIG. 4 illustrates three types of example active services: an IP information service 472, a domain registration service 474, and a domain popularity service 476. Though three types of example active services are illustrated in FIG. 4, one of ordinary skill in the art appreciates that other active services as are known in the art may be implemented as well.

In some embodiments, the IP Information Service 472 checks for information known about the IP addresses returned in the DNS response. Possible forms of the analysis may include the number of IP addresses returned, the registered owners of the IP addresses, the changing nature of the IP addresses returned for the same domain (a behavior referred to as "IP fluxing"), etc. The Domain Registration Service 474 scrutinizes the domain registration date, domain update date, domain expiration date, registrant identity, authorized name servers, etc. associated with a specific domain name. The Domain Popularity Service 476 provides information on the popularity of a domain name using any of a number of Internet services available for this purpose.

At 404, the AGD detection system may make a determination using data from the active services (e.g. 472, 474, 476) to characterize (e.g. categorize) the domain name under analysis. In some embodiments, the determination may include a point based system. For example, if the domain name under analysis matches a domain from a list of ghost domains (e.g. 348), the domain name under analysis may be assigned a certain amount of points. Likewise, each set of curated data type may be assigned a point value. If the domain name under analysis matches one or more of the domains, the domain name under analysis is given a certain amount of points. Further, each of the three active services may also correspond to a point value. As explained above (in reference to 302, FIG. 3) once a domain name has been categorized or classified using the active services, domain name categorization data may again be generated that may indicate whether the domain name under analysis is a heightened analysis domain name.

Figure 5:
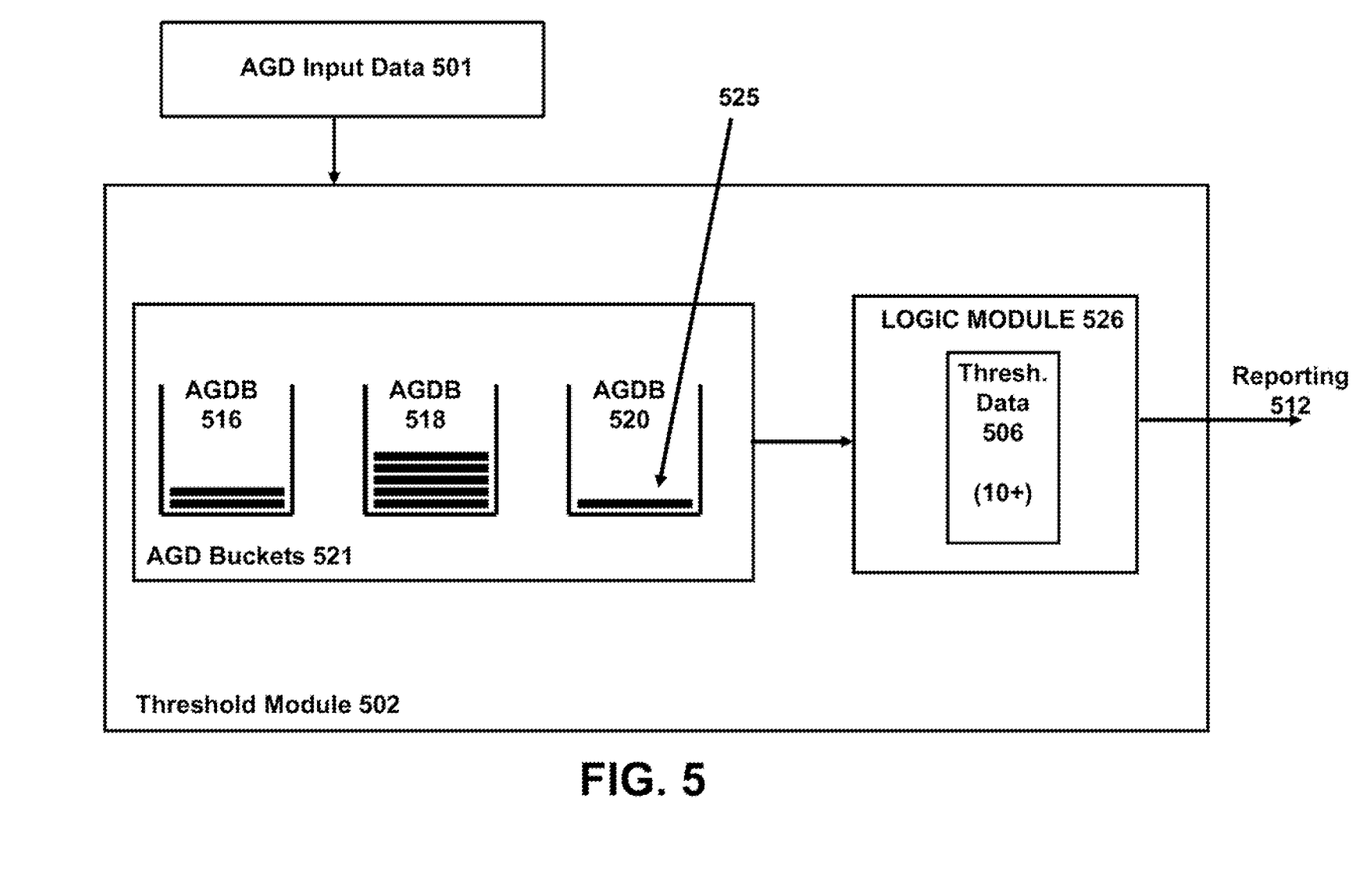
FIG. 5 shows an approach for detecting algorithm generated domains using threshold data structures, as according to some embodiments.

FIG. 5 shows an approach for detecting algorithm-generated domains using threshold data structures, as according to some embodiments. There, AGD input data 501 (e.g. data generated at 404, FIG. 4) may be input into a threshold module 502 for analysis and classification. In some embodiments, the threshold module 502 comprises an AGD bucket module 521 with one or more bucket data structures (e.g. 516, 518, 520). A bucket data structure (e.g. AGDB 520) may correspond to a domain name under analysis. The data structure may be configured in a way to correspond (e.g. hold, be assigned) to one or more analysis point data values 525. In some embodiments, an analysis point may be a pre-specified numerical value that can be adjusted depending on the severity of the factor under consideration. For example, if bucket data structure 520 corresponds to the domain under analysis "exampledomain.com", and at 302 (FIG. 3) it is determined that exampledomain.com is a evil twin domain (e.g. which are known to be "evil" or related to malicious activity as explained above), then analysis point 525 may have the numerical value of "10". However, if at 302 (FIG. 3) it is determined that exampledomain.com is a parked domain (e.g. which may be comparatively benign in some implementations) then analysis point 525 may have a numerical value of "1". In some embodiments, the various types of curated data sets (e.g. 342, 344, 346) and active services may have pre-specified analysis point values. The analysis point values may be pre-specified by a human expert. In those embodiments, the human expert may pre-specify the analysis point values and later readjust the values to reduce errors and/or false positives. In other embodiments, the analysis point values may be dynamically specified (e.g. modified) by a machine-learning scheme.

In some embodiments, the threshold module 502 comprises a logic module 526 that in turn comprises a threshold data item 506. The threshold data item 506 may correspond to a level or maximum for each bucket data structure, such that if the amount (e.g. number) of analysis point data values in the data structure surpasses the threshold value 506, the domain is marked for heightened analysis (e.g. marked as "suspicious"). In some embodiments, any match to a known malicious domain or algorithm-generated domain name may cause the threshold to be exceeded. Once the threshold has been surpassed the corresponding domain may be forwarded to other stages of analysis, such as a scoring/reporting stage 512.

Figure 6:
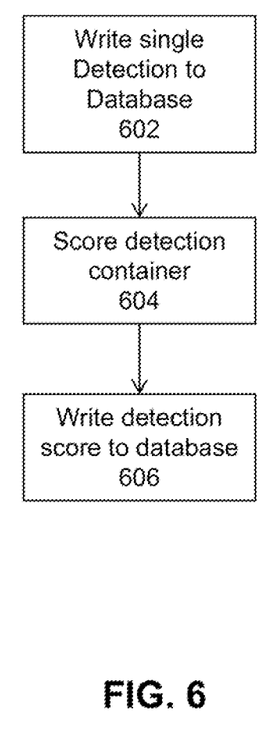
FIG. 6 shows a flowchart for an approach for detecting algorithm generated domains including details on scoring and publishing results.

FIG. 6 shows a flowchart for an approach for detecting algorithm-generated domains including details on scoring and publishing results. In some embodiments, the reporting and scoring stage may determine what data about the detections is written to the database (e.g. 126, FIG. 1) and, thus, may be analyzed by an IT security staff and/or machine learning controller. At 602, data about the current C&C detection is written to the database. For example, if a computing entity inside a network (e.g. network client 160, FIG. 1) requests a first domain, the domain may be analyzed as explained above, and data regarding the first domain may be written to the database. At 604, information about all the C&C detections that have recently been reported against the same internal host (e.g. network client 160 requesting a first domain, second domain, etc.) are retrieved from the database. Once retrieved, a certainty (e.g. confidence, accuracy) score may be computed for the collection of detections.

In some embodiments, the level of certainty (e.g. certainty score) may depend on one or more factors or certainty parameters. In some embodiments, one certainty parameter may be based in part on necessary conditions or sufficient conditions. For example, a necessary condition (to conclude a C&C domain is being requested) may be whether or not the requested domain has been sinkholed. If analysis using the curated content (FIG. 3) indicates that one of the domain names has been sinkholed, the certainty that the host is attempting to reach its C&C server may be very high.

In some embodiments, the certainty parameter may be a time related condition. For example, if the domain name being contacted is very new (a few days to a few weeks), the certainty may likewise be quite high. In some embodiments, the certainty parameter may relate to behavior conditions. For example, if many different AGDs are being looked up (many of which do not exist) within a short period of time, the certainty may also be quite high that C&C AGDs are being contacted. As one of ordinary skill in the art appreciates, the conditions may be used by themselves (e.g. using only the sinkholed necessary condition) or in a hybrid approach (e.g. a time related condition in addition to the sinkholed necessary condition).

At 606, once the certainty has been determined, the score may be written to the database for ultimate use by a company's IT security staff or use by a machine learning controller.

Figure 7:
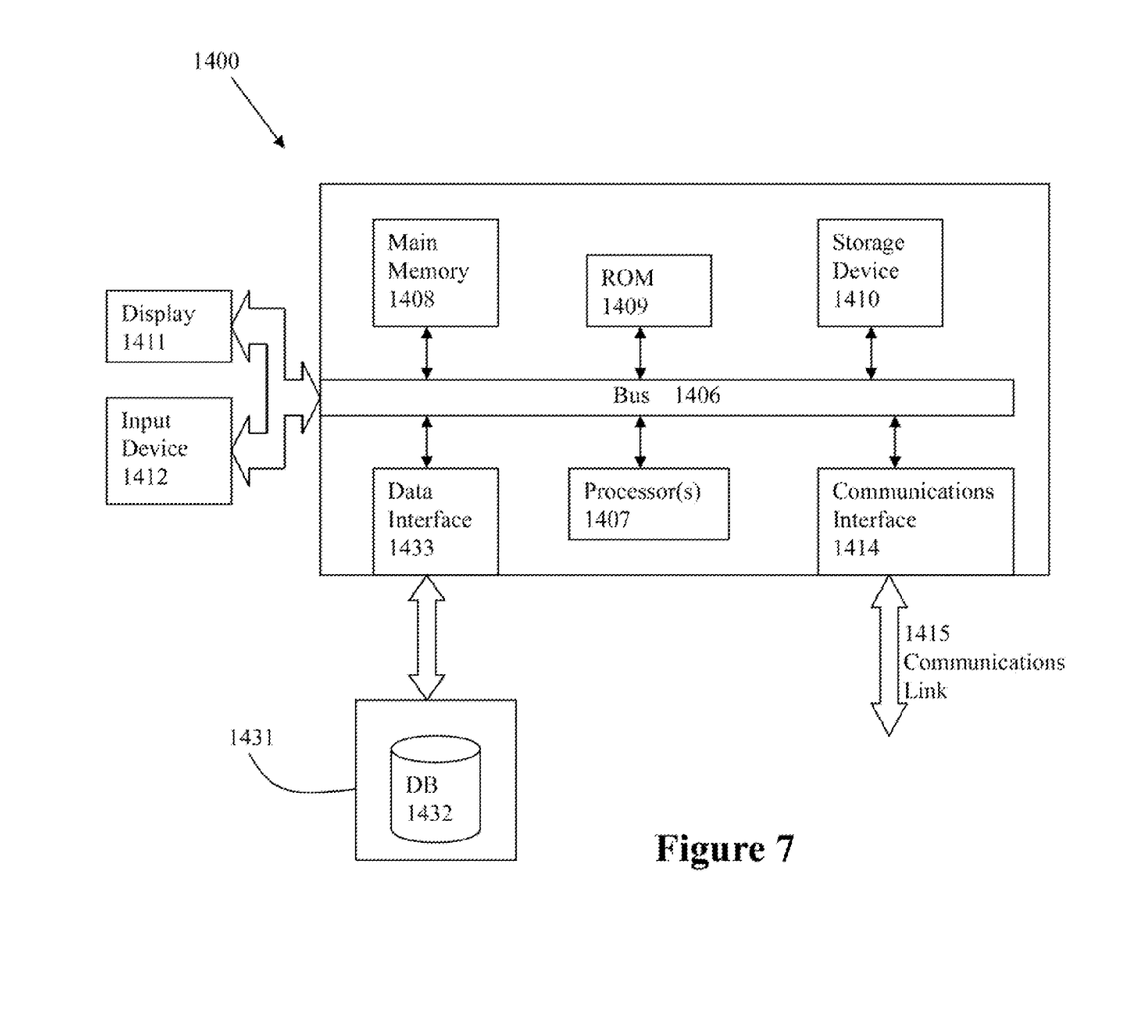
FIG. 7 depicts a computerized system on which an embodiment of the invention can be implemented.

FIG. 7 is a block diagram of an illustrative computing system 1400 suitable for implementing an embodiment of the present invention for performing intrusion detection. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control. A database 1432 may be accessed in a storage medium using a data interface 1433.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer-implemented method for detecting algorithm-generated domains (AGDs), the method comprising:

monitoring traffic within an organization's internal network, the internal network communicating with an external network through a border device, a flow preprocessor engine analyzing one or more requested domain names to identify algorithm generated domains corresponding to communications sent by an internal network client within the internal network, wherein the flow preprocessor engine is located inside the internal network;

identifying whether the one or more requested domain names correspond to potential algorithm generated domains;

determining whether the one or more requested domain names that correspond to potential algorithm generated domains exists;

categorizing the one or more requested domain names that exists using one or more curated datasets to generate domain name categorization data;

assigning the one or more requested domain names that exists to one or more bucket data structures;

assigning analysis point data values that correspond to the one or more requested domain names that exists to the one or more bucket data structures based at least in part on domain name categorization data; and generating reporting data that the one or more requested domain names that exists indicates AGD if the analysis point data values assigned to the one or more bucket data structures exceed a threshold value.

2. The method of claim 1, further comprising:
categorizing the one or more requested domain names using one or more active services to generate domain name categorization data.

3. The method of claim 1, further comprising:
determining whether the one or more requested domain names is a potential algorithm generated domain; and
ignoring the one or more requested domain names that is not a potential algorithm generated domain.

4. The method of claim 3, further comprising:
storing the reporting data for one or more domains requested by the internal network client in a database.

5. The method of claim 1, further comprising:
specifying the analysis point value for a curated dataset, wherein the specified analysis point value is dynamically modified by a machine-learning scheme; and
analyzing the generated reporting data by the machine-learning scheme to determine whether to adjust the specified analysis point value for the curated dataset based at least on the generated reporting data.

6. The method of claim 5, further comprising:
generating a certainty score for the one or more domains requested by the internal network client based at least in part on certainty parameters.

7. The method of claim 6, wherein the certainty parameters are based at least in part on one or more of the following group: necessary conditions, sufficient conditions, time related conditions, or behavior conditions.

8. The method of claim 1, wherein the one or more curated datasets comprise at least one dataset that corresponds to at least one of the following: evil twin domains, sinkholed domains, sleeper cells, ghost domains, parked domains, or bulk-registered domains.

9. The method of claim 2, wherein the one or more active services corresponds to at least one of the following: an IP information service, a domain registration service, or a domain popularity service.

10. A system for detecting algorithm-generated domains, comprising:

a computer processor to execute a set of program code instructions;

a memory to hold the program code instructions, in which the program code instructions comprises program code to perform:

monitoring traffic within an organization's internal network, the internal network communicating with an external network through a border device, a flow preprocessor engine analyzing one or more requested domain names to identify algorithm generated domains corresponding to communications sent by an internal network client within the internal network, wherein the flow preprocessor engine is located inside the internal network;

identifying whether the one or more requested domain names correspond to potential algorithm generated domains;

determining whether the one or more requested domain names that correspond to potential algorithm generated domains exists;

categorizing-one or more requested domain names that exists using one or more curated datasets to generate domain name categorization data;

assigning the one or more requested domain names that exists to one or more bucket data structures;

assigning analysis point data values that correspond to the one or more requested domain names that exists to the one or more bucket data structures based at least in part on domain name categorization data; and generating reporting data that the one or more requested domain names that exists indicates AGD if the analysis point data values assigned to the one or more bucket data structures exceeds a threshold value.

11. The system of claim 10, in which the program code instructions further comprises program code to categorize the one or more requested domain names using one or more active services to generate domain name categorization data.

12. The system of claim 10, further comprising:
determining whether the one or more requested domain names is a potential algorithm generated domain; and
ignoring the one or more requested domain names that is not a potential algorithm generated domain.

13. The system of claim 12, in which the program code instructions further comprises program code to store the reporting data for one or more domains requested by the internal network client in a database.

14. The system of claim 10, in which the program code instructions further comprises program code to:
specifying the analysis point value for a curated dataset, wherein the specified analysis point value is dynamically modified by a machine-learning scheme; and
analyzing the generated reporting data by the machine-learning scheme to determine whether to adjust the specified analysis point value for the curated dataset based at least on the generated reporting data.

15. The system of claim 14, in which the program code instructions further comprises program code to generate a certainty score for the one or more domains requested by the internal network client based at least in part on certainty parameters.

16. The system of claim 15, wherein the certainty parameters are based at least in part on one or more of the following group: necessary conditions, sufficient conditions, time related conditions, or behavior conditions.

17. The system of claim 10, wherein the one or more curated datasets comprise at least one dataset that corresponds to the following: evil twin domains, sinkholed domains, sleeper cells, ghost domains, parked domains, or bulk-registered domains.

18. The system of claim 11, wherein one or more the active services corresponds to at least one of the following: an IP information service, a domain registration service, or a domain popularity service.

19. A computer program product embodied on a non-transitory computer readable medium, the non-transitory computer readable medium having stored thereon a sequence of instructions which, when executed by a processor causes the processor to execute a method for detecting algorithm-generated domains (AGDs), the method comprising:

monitoring traffic within an organization's internal network, the internal network communicating with an external network through a border device, a flow preprocessor engine analyzing one or more requested domain names to identify algorithm generated domains corresponding to communications sent by an internal network client within the internal network, wherein the flow preprocessor engine is located inside the internal network;

identifying whether the one or more requested domain names correspond to potential algorithm generated domains;

determining whether the one or more requested domain names that correspond to potential algorithm generated domains exists;

categorizing one or more requested domain names that exists using one or more curated datasets to generate domain name categorization data;

assigning the one or more requested domain names that exists to one or more bucket data structures;

assigning analysis point data values that correspond to the one or more requested domain names that exists to the one or more bucket data structures based at least in part on domain name categorization data; and generating reporting data that the one or more requested domain names that exists indicates AGD if the analysis point data values assigned to the one or more bucket data structures exceeds a threshold value.

20. The computer program product of claim 19, wherein the non-transitory computer readable medium further comprises instructions which, when executed by the processor, causes the processor to execute the method further comprising:

categorizing the one or more requested domain names passively using one or more active services to generate domain name categorization data.

21. The computer program product of claim 19, further comprising:

determining whether the one or more requested domain names is a potential algorithm generated domain; and ignoring the one or more requested domain names that is not a potential algorithm generated domain.

22. The computer program product of claim 21, wherein the non-transitory computer readable medium further comprises instructions which, when executed by the processor, causes the processor to execute the method further comprising:

storing the reporting data for one or more domains requested by the internal network client in a database.

23. The computer program product of claim 19, wherein the non-transitory computer readable medium further comprises instructions which, when executed by the processor, causes the processor to execute the method further comprising:

specifying the analysis point value for a curated dataset, wherein the specified analysis point value is dynamically modified by a machine-learning scheme; and analyzing the generated reporting data by the machine-learning scheme to determine whether to adjust the specified analysis point value for the curated dataset based at least on the generated reporting data.

24. The computer program product of claim 19, wherein the non-transitory computer readable medium further comprises instructions which, when executed by the processor, causes the processor to execute the method further comprising:

generating a certainty score for the one or more domains requested by an internal network client based at least in part on certainty parameters.

25. The computer program product of claim 24, wherein the certainty parameters are based at least in part on one or more of the following group: necessary conditions, sufficient conditions, time related conditions, or behavior conditions.

26. The computer program product of claim 19, wherein the one or more curated datasets comprise at least one dataset that corresponds to the following: evil twin domains, sinkholed domains, sleeper cells, ghost domains, parked domains, or bulk-registered domains.

27. The computer program product of claim 20, wherein the one or more active services corresponds to at least one of the following: an IP information service, a domain registration service, or a domain popularity service.

* * * * *